United States Patent
Yeo et al.

(10) Patent No.: US 8,098,622 B2
(45) Date of Patent: Jan. 17, 2012

(54) METHOD FOR REQUESTING RESOURCE AND SCHEDULING FOR UPLINK TRAFFIC IN MOBILE COMMUNICATION AND APPARATUS THEREOF

(75) Inventors: Geon-Min Yeo, Daejeon (KR); Byung-Han Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 179 days.

(21) Appl. No.: 12/089,342

(22) PCT Filed: Sep. 29, 2006

(86) PCT No.: PCT/KR2006/003937
§ 371 (c)(1),
(2), (4) Date: Apr. 4, 2008

(87) PCT Pub. No.: WO2007/040323
PCT Pub. Date: Apr. 12, 2007

(65) Prior Publication Data
US 2008/0232260 A1 Sep. 25, 2008

(30) Foreign Application Priority Data
Oct. 5, 2005 (KR) .................. 10-2005-0093372

(51) Int. Cl.
*H04W 4/00* (2009.01)
(52) U.S. Cl. ........ 370/329; 370/310; 370/322; 370/328; 370/338; 370/341; 370/351; 370/395.1; 370/437; 370/441; 370/447; 370/468; 370/506; 709/226; 455/435.1; 455/436; 455/450; 455/500; 455/507; 455/517; 455/522
(58) Field of Classification Search ............... None
See application file for complete search history.

(56) References Cited

U.S. PATENT DOCUMENTS
6,839,356 B2 * 1/2005 Barany et al. ............... 370/401
(Continued)

FOREIGN PATENT DOCUMENTS
KR 1020050041207 5/2005
(Continued)

OTHER PUBLICATIONS
3GPP, "uplink scheduling policies in Eutran", Oct. 2005.*
(Continued)

*Primary Examiner* — Jason Mattis
*Assistant Examiner* — Aixa A Guadalupe
(74) *Attorney, Agent, or Firm* — Kile Park Goekjian Reed & McManus PLLC

(57) ABSTRACT

The present invention relates to a resource allocation requesting method and a packet scheduling method for uplink packet traffic in a mobile communication system, and an apparatus of the packet scheduling method. For efficient scheduling for the uplink traffic, scheduling is performed according to characteristics of traffic between a base station and user equipment (UE). Particularly, when the traffic generates a variable size packet on a periodic basis, the traffic is classified into first traffic that generates a completely variable size packet on a periodic basis and second traffic that generates a quasi-variable size packet on a periodic basis. In addition, the UE requests resource allocation in a different form from the base station depending on the type of traffic, and the base station performs scheduling according to the resource allocation request. Therefore, the UE requests resource allocation in accordance with traffic characteristics and the base station performs scheduling according to the traffic characteristics so that optimal uplink scheduling can be performed.

13 Claims, 7 Drawing Sheets

U.S. PATENT DOCUMENTS

| | | | |
|---|---|---|---|
| 7,321,780 B2 * | 1/2008 | Love et al. | 455/522 |
| 7,558,247 B2 * | 7/2009 | Lee et al. | 370/351 |
| 2004/0013135 A1 | 1/2004 | Haddad | |
| 2004/0219919 A1 * | 11/2004 | Whinnett et al. | 455/442 |
| 2005/0073985 A1 * | 4/2005 | Heo et al. | 370/342 |
| 2005/0105553 A1 * | 5/2005 | Zhang et al. | 370/468 |

FOREIGN PATENT DOCUMENTS

| | | |
|---|---|---|
| WO | 2005050851 | 6/2005 |

OTHER PUBLICATIONS

Discussion about QoS improvements in MBMS, ETRI, Oct. 10-14, 2005, pp. 1-2.

Uplink scheduling policies in EUTRAN, ETRI, Oct. 10-14, 2005, pp. 1-5.

International Search Report for PCT/KR2006/003937 Dated Jan. 22, 2007.

Written Opinion for PCT/KR2006/003937 Dated Jan. 22, 2007.

* cited by examiner

[FIG. 1]
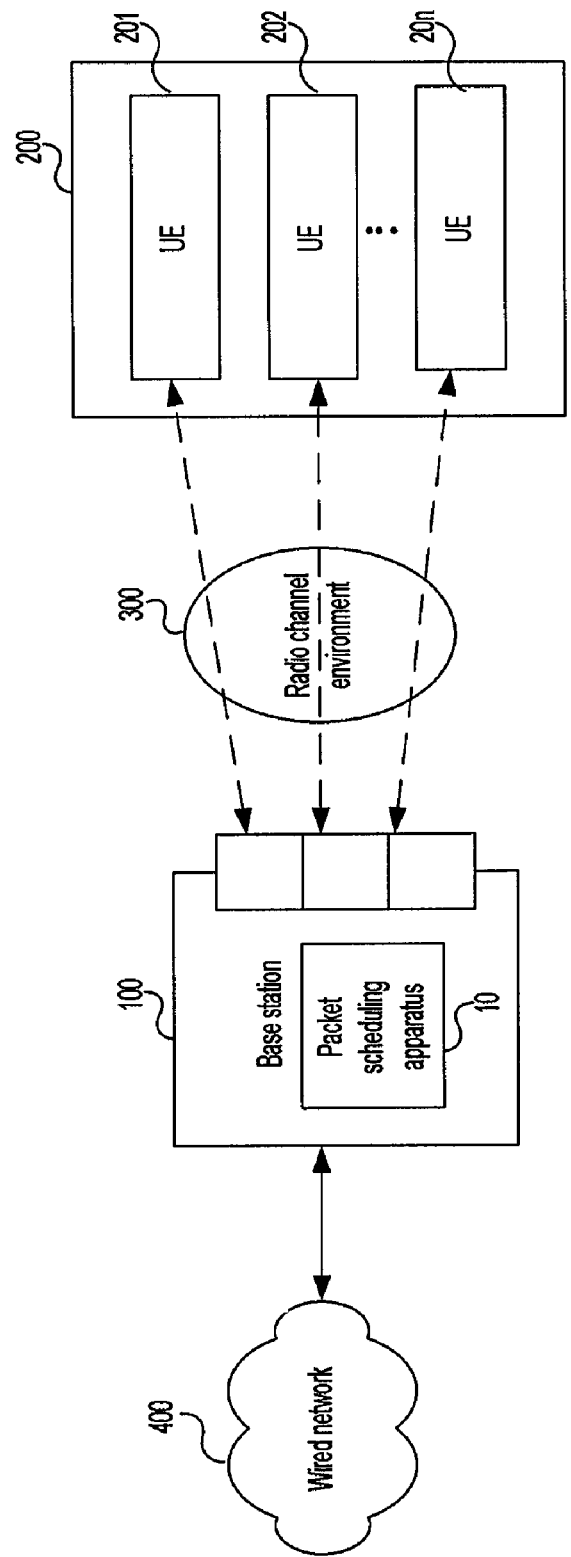

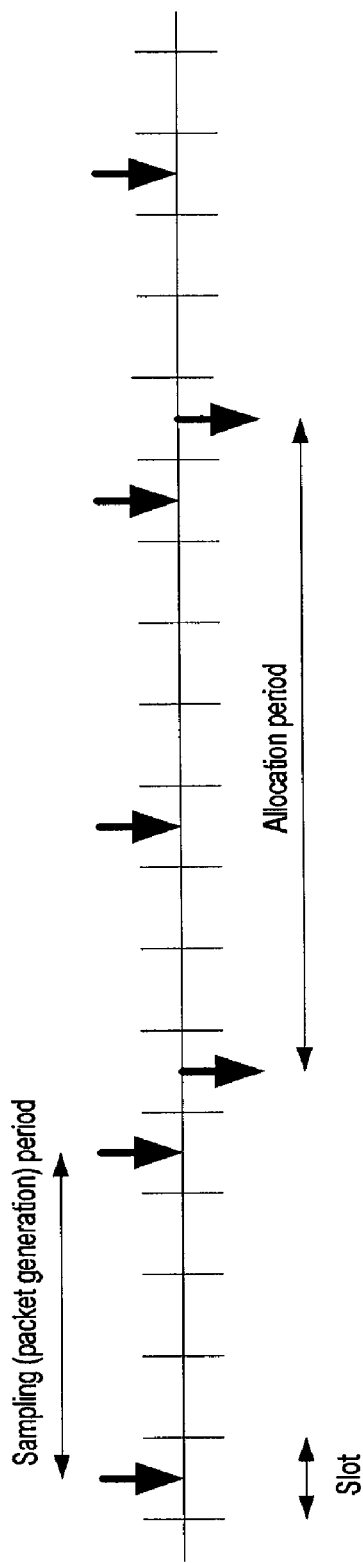
[FIG. 2]

[FIG. 3]
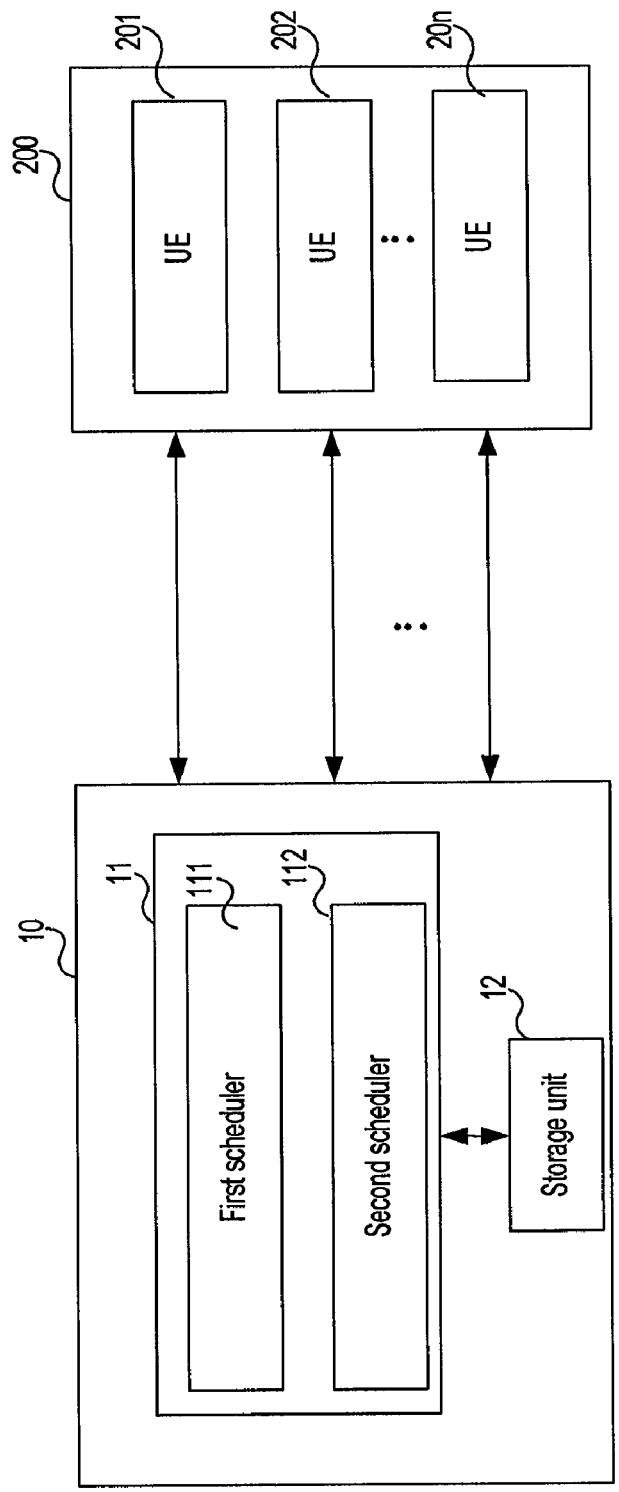

[FIG. 4]
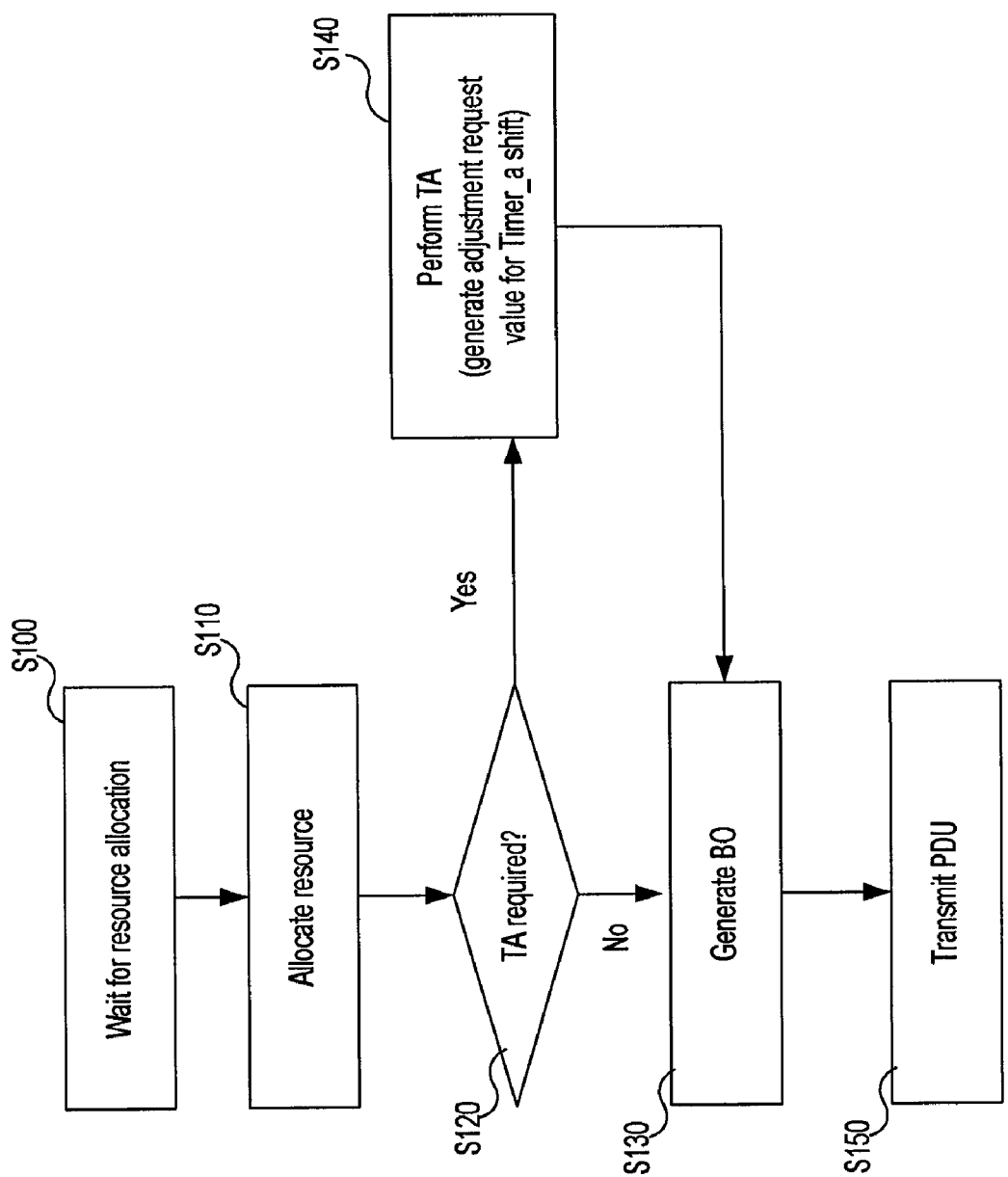

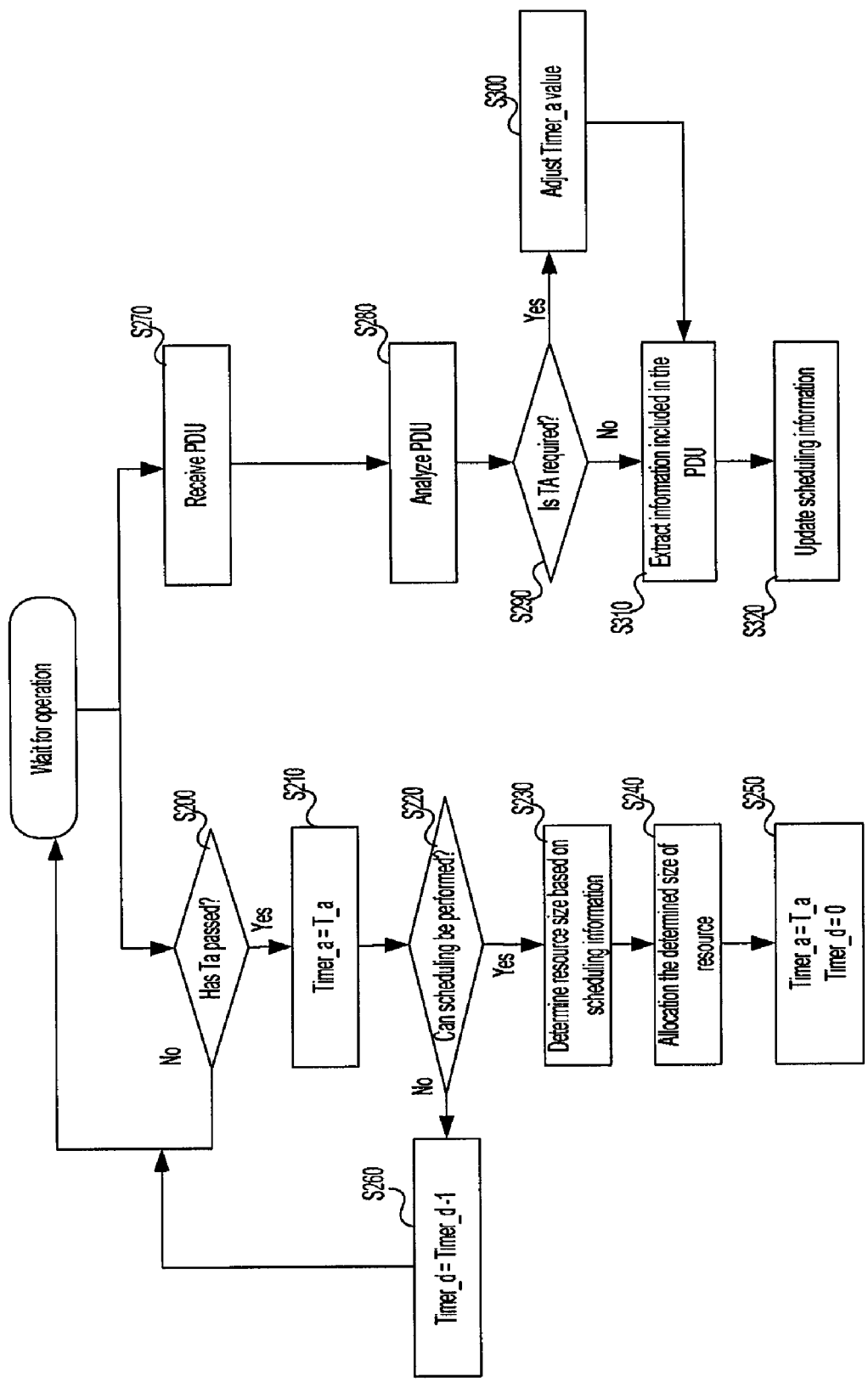
[FIG. 5]

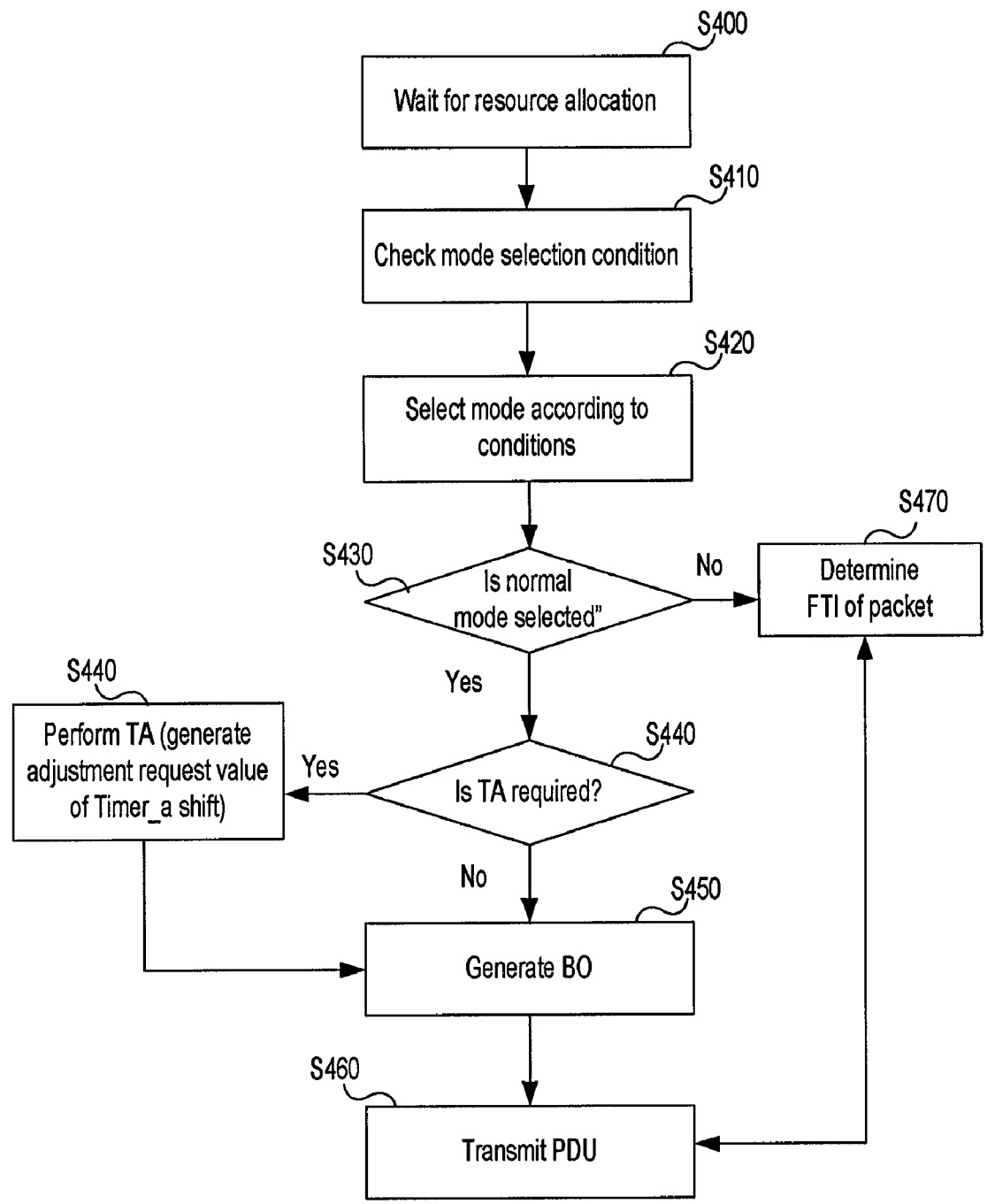
[FIG. 6]

[FIG. 7]
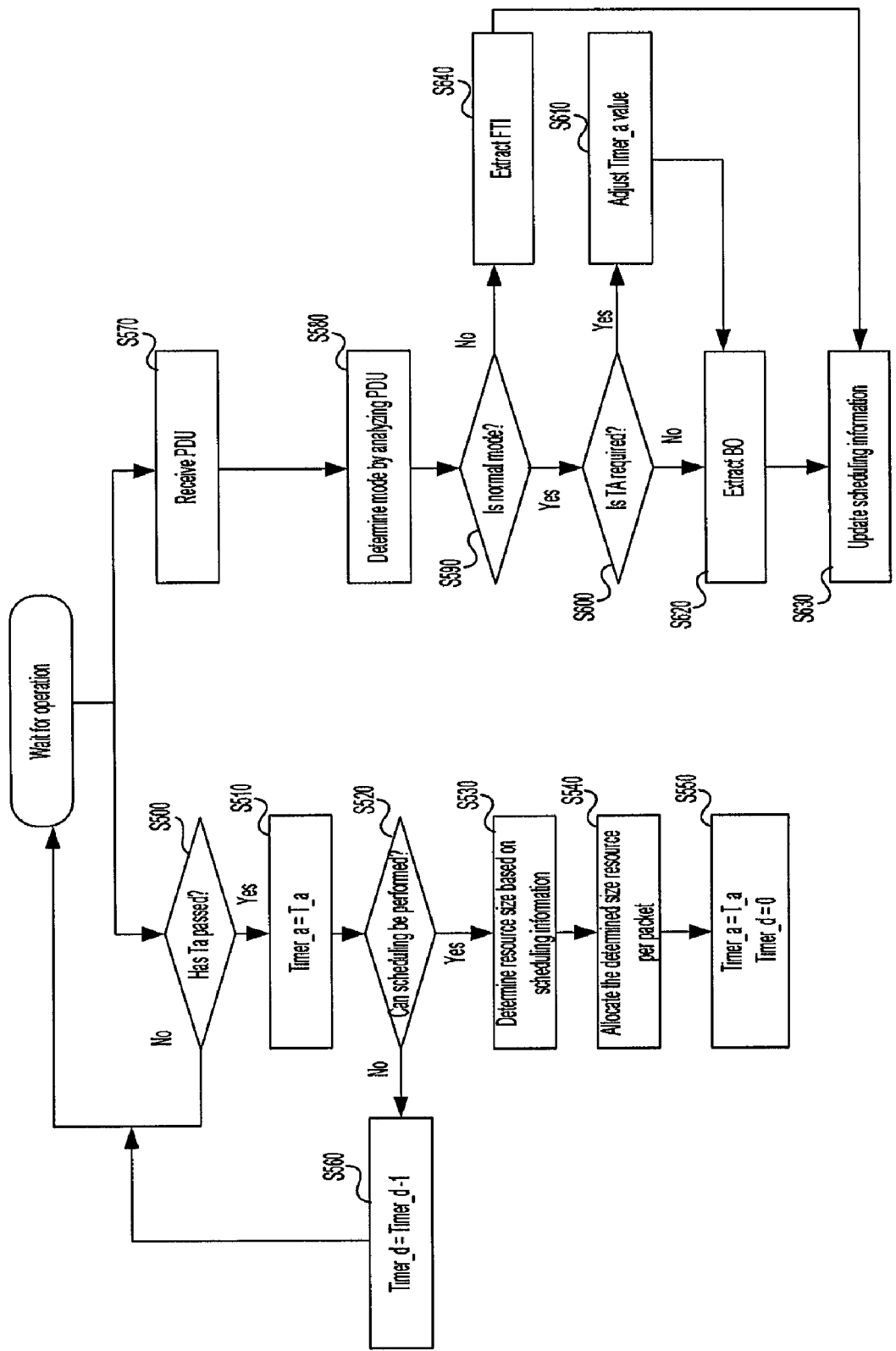

METHOD FOR REQUESTING RESOURCE AND SCHEDULING FOR UPLINK TRAFFIC IN MOBILE COMMUNICATION AND APPARATUS THEREOF

TECHNICAL FIELD

The present invention relates to a scheduling method of a mobile communication system, and more particularly relates to a method for requesting resources and packet scheduling, and an apparatus using the same.

BACKGROUND ART

Recently, a standard protocol and a system for wireless Internet service have been actively developed, and accordingly, the importance of a packet transmission technique has been highlighted for pre-empting technical power in a packet-based fourth generation mobile communication system.

A resource allocation request and link packet scheduling methods for satisfying quality of service (QoS) requirements and maximizing wireless link efficiency in packet transmission packet is a specialized field of wireless link sharing, and is valued as an important resource for improving system capacity compared to a conventional wired system.

A resource request includes a series of processes in which user equipment (UE) informs the presence of uplink data to a base station and requests a necessary amount of resource allocation. A scheduling method of which the base station allocates resources to the UE can be divided into an uplink scheduling method and a downlink scheduling method.

According to the downlink scheduling method, the base station allocates resources while checking the amount of data packets stored in a transmit buffer of the base station in real-time. According to the uplink scheduling method, the base station allocates resources on the basis of buffer state information reported from the UE. Therefore, an efficient resource request method is required for maximizing radio resource utilization and providing quality of service (QoS) in the uplink scheduling method. In order to realize the efficient resource request method, a transmit buffer state should be timely reported with sufficient information.

Timeliness indicates that the UE should timely report the transmit buffer state information so as to guarantee QoS. For example, when the amount of data packets queued in the transmit buffer is increasing and the UE does not report the transmit buffer state, data is transmitted through subsequently allocated uplink resources. However, in this case, the resources through which the data is transmitted are allocated without considering the state of the transmit buffer. Therefore, with respect to a network, the data does not satisfy delay requirements. As a result, the data successfully transmitted from a transmitting side may be discarded in a receiving side. Meanwhile, uplink packet scheduling performance may be improved as the number of reports on the state of the transmit buffer of the UE increases. However, excessive resource use may cause a trade-off.

The timeliness of the reporting has a close relationship to a time interval from the time that the UE determines a resource request to the time that the base station perceives the request. As the time that the base station perceives the resource request of the UE is delayed, the time interval is increased, thereby decreasing utility of transmitted data. The delay is closely related to design of frame and channel structures.

Sufficiency of information indicates that information provided by the UE should include sufficient information for efficient uplink scheduling of differentiated multimedia services. For example, in the case of a file transfer protocol (FTP) that is insensitive to time delay compared to other services, information on the amount of packets queued in the transmit buffer is more worthy than information on a packet that has been transmitted to the transmit buffer for the first time (so-called head-of-line, HOL). Therefore, since unnecessary and unimportant information is inappropriate with respect to utilization of radio resources, the reporting contents should include sufficient information for efficient scheduling.

As described, information on the transmit buffer state reported to the base station from the UE for uplink scheduling may be called scheduling information, and the scheduling information must include optimum information for efficient scheduling. The uplink scheduling is performed on the basis of the scheduling information and QoS information exchanged between the UE and the base station when establishing a connection therebetween. The QoS information is an index that should be satisfied on average or ultimately, and the scheduling information is a measure that indicates short-term service satisfaction of a user. Therefore, optimum uplink scheduling can be achieved when the QoS information and the scheduling information are converged to each other. Since the QoS information and the scheduling information vary depending on characteristics of traffic between the UE and the base station, a resource request method and a scheduling method that provide efficient scheduling information according to characteristics of traffic are required in order to achieve optimum uplink scheduling.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a resource request and packet scheduling method that can guarantee QoS according to characteristics of various uplink traffic in a packet-based mobile communication system.

Particularly, the present invention provides an efficient resource allocation request method for traffic that generates a variable size packet with a periodic time interval.

In addition, the present invention provides a packet scheduling method for efficiently allocating resources upon a resource allocation request for traffic that generates a variable size packet with a periodic time interval, and an apparatus using the same.

Technical Solution

A resource allocation request method according to an embodiment of the present invention is provided to user equipment (UE) for requesting resource allocation for uplink traffic transmission from the UE to a base station in a mobile communication system. The resource allocation request method includes a) checking mode selection conditions, by the UE; b) selecting an operation mode among a limited mode and a normal mode according to the checking result; c) when the normal mode is selected, generating scheduling information that indicates a state of a transmit buffer in which a packet to be transmitted is queued, by the UE; d) when the limited mode is selected, generating scheduling information that indicates a packet queued in the transmit buffer, by the UE;

and e) requesting resource allocation while transmitting the scheduling information to the base station, by the UE.

A resource allocation request method according to another embodiment of the present invention is provided to user equipment (UE) for requesting resource allocation for uplink traffic from the UE to a base station in a mobile communication system. The resource allocation request method includes: a) generating buffer state information that indicates a state of a transmit buffer in which a packet to be transmitted is queued, by the UE; b) generating a resource allocation time adjustment request value when a resource allocation time negotiated with the base station is required, by the UE; c) generating scheduling information selectively including the buffer state information and the resource allocation time adjustment request value; and d) requesting resource allocation while transmitting the scheduling information to the base station, together with the packet queued in the transmit buffer.

A packet scheduling method according to another embodiment of the present invention is provided for uplink traffic transmission from user equipment (UE) to a base station in a mobile communication system. The packet scheduling method includes a) receiving a packet frame having a periodically varying size and scheduling information from the UE, by the base station; updating scheduling information for a session with the UE according to the scheduling information; and c) periodically allocating a variable size resource for the session with the UE based on the updated scheduling information.

Herein, b) includes: b-1) determining a mode selected by the UE based on the scheduling information; b-2) when a normal mode is selected, acquiring resource allocation time adjustment information or information on a packet queued in a transmit buffer of the UE from the scheduling information transmitted from the UE; b-3) when a limited mode is selected, acquiring information on the packet queued in the transmit buffer from the scheduling information transmitted from the UE; and updating scheduling information for the session with the UE according to the acquired information.

A packet scheduling apparatus according to another embodiment of the present invention is provided for uplink traffic transmission from user equipment (UE) to a base station in a mobile communication system. The packet scheduling apparatus includes a storage unit, a first scheduler, and a second scheduler. The storage unit stores scheduling information on the UE. The first scheduler allocates a completely variable size resource with a periodic time interval to the UE based on the scheduling information. The second scheduler allocates a quasi-variable size resource with a periodic time interval to the UE based on the scheduling information. The uplink traffic generates a variable size packet with a periodic time interval.

DESCRIPTION OF DRAWINGS

FIG. 1 is a configuration diagram of a mobile communication system according to an exemplary embodiment of the present invention.

FIG. 2 shows an exemplary packet generation pattern of PV traffic.

FIG. 3 is a configuration diagram of a packet scheduling apparatus according to the exemplary embodiment of the present invention.

FIG. 4 is an operation flowchart of user equipment (UE) according to the first exemplary embodiment of the present invention.

FIG. 5 is an operation flowchart of a base station according to a first exemplary embodiment of the present invention.

FIG. 6 is an operation flowchart of the UE according to the second exemplary embodiment of the present invention.

FIG. 7 is an operation flowchart of a base station according to a second exemplary embodiment of the present invention.

BEST MODE

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

In addition, throughout this specification and the claims which follow, unless explicitly described to the contrary, the word "comprise" and variations such as "comprises" or "comprising" will be understood to imply the inclusion of stated elements but not the exclusion of any other elements.

FIG. 1 is a configuration diagram of a mobile communication system according to an exemplary embodiment of the present invention.

As shown in FIG. 1, in a mobile communication system according to the exemplary embodiment of the present invention, a base station 100 communicates data with a plurality of user equipment (UE) 201 to 20n (where n is a positive integer) through a wireless channel environment. For better understanding and ease of description, the UE will be assigned the reference number 200.

The UE 200 includes a transmit buffer (not shown) for storing uplink traffic data. The transmit buffer temporarily stores packet data to be transmitted to the BS 100, and the packet data is converted to a packet frame in a medium access control (MAC) layer and transmitted to the BS 100 through a physical layer. The amount of packet traffic is time-varying, and therefore the transmit buffer state is also time-varying. Therefore, the transmit buffer state should be reported to the BS 110 for efficient resource management.

For this purpose, the UE 200 provides scheduling information to the BS 100. The scheduling information includes a buffer occupancy (hereinafter referred to as "BO") for indicating information on packet data queued in the transmit buffer of the UE 200, a head-of-line (HOL) delay time, and the number of packet data, and may include all information provided from the UE 200 to the BS 100 for scheduling.

The BO indicates a transmit buffer state after data transmission through allocated resources from a current BS, and more particularly, it indicates the number of packet data remaining in a current transmit buffer. The number of packet data basically indicates a total byte number of packet data. In the case that a predetermined byte forms a basic transmission unit, the number of packet data may indicate the number of basic transmission units.

The HOL delay time indicates a time interval between a first packet data input time and a current time, wherein the first packet data indicates packet data input to the transmit buffer for the first time among data packet queued in the transmit buffer. That is, the HOL delay time may indicate the amount of time that the first packet data has been queued in the transmit buffer without being transmitted.

The UE 200 converts data packets queued in the transmit buffer to a packet frame in a physical layer. That is, the UE 200 converts a service data unit (SDU) input to a medium access control (MAC) layer from an upper layer into a packet data unit (PDU) and transmits the PDU. The PDU is broadly formed of a header, a payload, and/or a cyclic redundancy check for error detection. The header indicates a destination address to which packet traffic is transmitted and a data type, and the payload stores data and has a varying length depending on the type of packet data. A PDU that does not include a payload is called a "status PDU". The status PDU is not for data transmission but for predetermined information transmission, and may have a fixed length.

The UE 200 may use various methods for transmitting scheduling information to the base station 100. A resource request method for requesting resource allocation by transmitting the scheduling information to the base station 100 may be changed in accordance with a scheduling information transmission method, and can be classified as shown in Table 1.

TABLE 1

| Type | Definition |
| --- | --- |
| First resource request method | UE transmits scheduling information through a status PDU to a base station |
| Second resource request method | UE includes scheduling information in a header of a PDU for data transmission and transmits the PDU to a base station |
| Third resource request method | UE concatenates scheduling information to a PDU for data transmission and transmits the PDU to a base station |
| Fourth resource request method | UE transmits scheduling information to a base station by using random access |
| Fifth resource request method | UE transmits scheduling information by using a physical channel |

The respective resource request methods process the scheduling information to an information element (IE), and transmit the IE to the base station by including the IE to the PDU header, concatenating the IE to the PDU, or processing the IE to the statue PDU. Herein, the IE indicates single information formed of several bits.

The base station 100 communicates data with the UE 200, and, particularly, the base station 100 schedules an uplink channel of the corresponding UE based on scheduling information provided from the UE 200. For this purpose the base station 100 includes a packet scheduling apparatus 10, and provides information for the scheduling to the packet scheduling apparatus by communicating data with at least one UE.

Particularly, when a connection between the base station 100 and the UE 200 is established, the base station 100 negotiates basic functionality with the UE 200, and methods for authorization and other processes are set. At this time, a scheduling method is negotiated, and a scheduling method is selected in accordance with traffic provided in the exemplary embodiment of the present invention. The traffic can be classified as shown in Table 2.

TABLE 2

| Type | Definition |
| --- | --- |
| PF traffic | Periodic-interval with fixed size |
| PV traffic | Periodic-interval variable size |
| AV traffic | Aperiodic-interval variable size |

The PF traffic, for example, includes voice over service traffic. The PV traffic, for example, includes MPEG video traffic. The AV traffic, for example, includes file transfer protocol (FTP) traffic. The UE may use different resource request methods for the respective uplink traffic according to characteristics of the corresponding traffic.

The types of the respective uplink traffic of the UE are classified in accordance with the classified characteristics in Table 2, and a proper scheduling method is selected from among a plurality of scheduling methods depending on the type of the uplink traffic. A scheduling method according to the exemplary embodiment of the present invention can be classified as shown in Table 3.

TABLE 3

| Type | Definition |
| --- | --- |
| PF scheduling | Allocate a fixed amount of resources on the basis of periodic time interval |
| PV scheduling | Allocate variable-size resources on the basis of periodic time interval |
| PQ scheduling | Allocate resource for request on the basis of periodic time interval |
| BE scheduling | Allocate resource by using random access of UE |

Among the above-stated traffic, the PV traffic generates variable-size packets on a periodic basis, with a pattern of FIG. 2. FIG. 2 exemplarily shows a packet generation pattern of the PV traffic.

The PV traffic requires real-time transmission. Therefore, a necessary amount of resource should be timely allocated so as to guarantee a QoS and optimize efficiency of resource use. Since the PV traffic is delay-sensitive, a necessary amount of resources should be timely allocated to thereby minimize resource waste.

Uplink scheduling is performed on the basis of information reported from the UE, and therefore the UE should report a transmit buffer state by using a proper method to the base station. When the UE reports the transmit buffer state without being allocated with a resource, the UE uses random access as in the BE scheduling. However, there are problems with this case. That is, frequent random access may cause frequent collisions and the frequent collisions may cause delay. In addition, the transmit buffer state may not be timely reported.

Therefore, a more appropriate scheduling algorithm is required for the delay-sensitive and real-time-based PV traffic. According to the exemplary embodiment of the present invention, the PV traffic is classified depending on characteristics of each PV traffic and a different scheduling algorithm is used for each PV traffic.

In more detail, the PV traffic is classified into first PV traffic and second PV traffic according to packet-size variation.

The first PV traffic generates a packet of completely variable size on a periodic basis. Herein, the "completely variable" means that the size of a packet is changed for every packet generation. The first PV traffic generates, for example, an MPEG of completely variable size.

The second PV traffic generates a packet of quasi-variable size on a periodic basis. Herein, "quasi-variable" means that the size of a packet is assigned one of a plurality of predetermined sizes per packet generation. The second PV traffic generates, for example, a voice over Internet protocol (VoIP) with silence suppression and/or multi-rate, and substantial examples of the second PV traffic include an adaptive multi-rate (AMR) and a G.729B.

The AMR is used by a 3GPP-based WCDMA system, and includes 9 frames for variable-size data, and a silence insertion description (SID) frame and a No Data frame for silence suppression. Additionally, the AMR includes a Speech Loss frame. Meanwhile, the G.729B includes a frame for fixed-size data transmission, and an SID frame and a No Data frame for the silence suppression. The AMR and the G.729B can both be included in traffic that generates the quasi-variable size packet because each codec generates a packet having one of predetermined fixed sizes, and the predetermined fixed sizes are different from each other. The quasi-variable size of the second PV traffic can be identified by a frame type indicator (FTI).

In addition, the PV scheduling method is divided into a first PV scheduling method and a second PV scheduling method according to the exemplary embodiment of the present invention.

The first PV scheduling method allocates a variable-size resource, and is called a PV with complete variation (PV-c) method. The first PV scheduling method is targeted for traffic (i.e., first PV traffic) that generates a completely-variable size packet.

The second PV scheduling method allocates a quasi-variable size resource on periodic basis, and is called a PV with quasi-variation (PV-q) method. The second PV scheduling method is targeted not for the first PV traffic that generates a completely-variable size packet but for traffic (i.e., second PV traffic) that generates a packet having one of fixed sizes at every packet generation time.

Therefore, when resources are allocated in accordance with the second PV scheduling method, the UE may reduce an overhead in reporting BO by using characteristics of packet generation. In more detail, since the size of a generated packet can be represented by an FTI that indicates a predetermined size, the UE reports the size of the generated packet by applying the FTI into a header of a frame for transmitting the data rather than reporting the packet size through the BO. Therefore, the overhead in reporting can be reduced, and in this case, a receiving side knows the size of the corresponding frame (equal to packet) based on the FTI.

For efficient realization of the second PV scheduling, one condition must be satisfied. The condition is that resource allocation targets for one packet. According to the PV scheduling method, a resource allocation interval T_a may include several generation periods. In this case, packets queued in the transmit buffer of the UE may have a different frame type. For example, when the UE in a communication state transfers into a silence state, data packets and SID packets may be queued together in the transmit buffer. In this case, when reporting a current state of the transmit buffer by using an FTI, the number of packets that have a different FTI must be included. That is, the number of data packets must be included in an FTI representing a data packet and the number of SID packets must be included in a FTI representing an SID packet. As a result, an overhead in reporting scheduling information may be greater than an overhead in a generic PV scheduling method. Therefore, it is preferred to allocate a resource upon every packet generation to have only one packet queued in the transmit buffer for efficient realization of the second PV scheduling. However, this is not restrictive.

The second PV scheduling method uses one of a limited mode and a normal mode.

In the limited mode, the UE reports scheduling information by using an FTI as previously described, and the base station acquires scheduling information based on the FTI. In the normal mode, the UE reports the scheduling information by using an additional BO, and the base station acquires scheduling information based on the BO.

The second PV scheduling method switches the limited mode to the normal mode in the following cases:

1) In the case that a periodic resource allocation interval needs to be changed.

2) In the case that an additional real-time transport control protocol (RTCP) packet is entered.

3) In the case that uplink packet transmission is not performed because the base station does not allocate resources to the UE or the UE cannot decode resource allocation information even though the base station has allocated resources.

When the above-stated cases occur, the UE switches the second PV scheduling method from the limited mode to the normal mode and reports scheduling information. In this case, the base station acquires scheduling information based on an FTI of a frame in the limited mode, and then acquires the scheduling information from a status PDU transmitted separately from a PDU, a header of the PDU, or a status PDU adjacent to the PDU after the limited mode is switched to the normal mode.

In the limited mode, two packets must be queued in the UE. This is because the UE transmits a first packet when the UE is allocated with a resource and additionally reports FTI for a second packet queued in the transmit buffer. In this case, the base station does know the amount of the next resource allocation while receiving the first packet.

According to such a scheduling method, the scheduling information according to the exemplary embodiment of the present invention may include BO, a resource allocation time change request value, and an FTI, wherein the BO includes BO on a packet that is not transmitted and BO on a queued RTCP packet.

Meanwhile, the base station can set a scheduling method by automatically determining the type of traffic transmitted from the UE rather than setting a scheduling method during the negotiation. In this case, a header of a transmitted frame generally includes information on the type of the traffic and therefore the base station can determine the type of the transmitted traffic.

FIG. 3 is a configuration diagram of a packet scheduling apparatus according to the exemplary embodiment of the present invention.

As shown in FIG. 3, the packet scheduling apparatus includes a scheduler 11 and a storage unit 12 for storing scheduling information.

The scheduler 11 schedules a session with the corresponding UE according to a determined scheduling method. Particularly, the scheduler 11 includes a first scheduler 111 and a second scheduler 112 for performing the scheduling methods according to the exemplary embodiment of the present invention.

The first scheduler 111 allocates resources to the UE according to the first PV (PV-c) scheduling method, and the second scheduler 112 allocates resources to the UE according to the second PV (PV-q) scheduling method. The schedulers illustrated in FIG. 3 are provided for the PV scheduling, but the scheduler 11 may further include schedulers for selectively performing the PF scheduling, PQ scheduling, and BE scheduling.

The storage unit 12 stores scheduling information for a session with a predetermined UE. Particularly, the storage unit 12 may store scheduling information provided by the UE in addition to the scheduling information set to the session. The respective schedulers 111 and 112 perform scheduling based on the scheduling information stored in the storage unit 12, and update the stored scheduling information according to information provided by the UE.

In the following exemplary embodiment, the base station mainly performs scheduling, but substantially, a packet scheduling apparatus 10 may include a plurality of schedulers respectively corresponding to the scheduling methods and perform scheduling by using the corresponding scheduler.

A resource allocation request for uplink traffic and a packet scheduling method according to the exemplary embodiment of the present invention will now be described in more detail.

According to the PV scheduling method, a resource of a variable-size ($S\_a$) is allocated to the UE with a periodical time interval ($T\_a$). A resource allocation start time ($T\_s$) is an offset value indicating an interval between the time that a connection is established and the time that the base station initially allocates resources through the connection. In addition, a time interval ($T\_a$) is an offset value indicating an interval between current resource allocation and the next resource allocation attempt. The time interval $T\_a$ and the resource allocation start time $T\_s$ are negotiated when a connection is established between the UE and the base station. Connection establishment and negotiation between the UE and the base station is well known to those skilled in the art, and therefore a detailed description will be omitted.

According to the exemplary embodiment of the present invention, a resource allocation timer Timer_a is used to count the resource allocation start time $T\_s$ and the time interval $T\_a$, and a resource allocation delay timer Timer_d is used to prioritize resource allocation. Timer_a=$T\_s$ when the connection is established, and is decremented by 1 per slot. When Timer_a=0, resource allocation is attempted, and then the resource allocation timer Timer_a is updated to Timer_a=$T\_a$. When no resource allocation is attempted when Timer_a=0, the resource allocation delay timer Timer_d starts. Herein, a default value of Timer_d is 0. After Timer_d is started, it is decremented by 1 per slot. When resource allocation is attempted when Timer_a=0, Timer_d is updated to its default value of 0 and is not further decremented.

FIG. 4 and FIG. 5 are flowcharts of a PV scheduling method according to a first exemplary embodiment of the present invention. Particularly, the flowchart of FIG. 4 shows operation of the UE for the first PV scheduling and the flowchart of FIG. 5 shows operation of the base station for the first PV scheduling.

When a connection is established between the UE and the base station and thus the time interval $T\_a$ and the resource allocation start time $T\_s$ are set, the UE requests resource allocation for a session with the base station as shown in FIG. 4.

The UE performs the following process for a resource request.

As shown in FIG. 4, after the negotiation, the UE 200 waits for resource allocation of the base station 100. In this case, the base station 100 may randomly allocate a predetermined amount of resources without taking information reported by the UE 200 into account. When the base station 100 allocates a resource of a fixed size ($S\_a$) after a predetermined time has passed in steps S100 and S110, the UE 200 processes data (SDUs) queued in the transmit buffer into PDUs and transmits the PDUs through the allocation resource to the base station 100.

In this case, the UE transmits scheduling information together with the PDUs. In more detail, the UE 200 generates BO for additional SDUs to be transmitted in the transmit buffer and BO for queued RTCP packets in the transmit buffer, and forms scheduling information based on the BOs in step S120 and S130. Herein, the BO for the additional SDUs queued in the transmit buffer and the BO for the queued RTCP packets may be independently formed in an information element (IE) or integrally formed in one IE.

The additional SDUs to be transmitted can be generated a) in the case that the base station intentionally does not timely allocate resources or t timely allocates an insufficient amount of resources for transmitting currently queued data (SDUs) in the buffer due to radio resource insufficiency or for efficient radio resource management, b) in the case that the base station allocates resources and the UE cannot decode the resource allocation information of the base station, and c) in the case that the UE transmits PDUs through an allocated resource and the base station cannot decode the transmitted PDUs.

In the case of (a), the base station intentionally does not allocate resources although the base station is aware of scheduling information on the UE, and therefore the base station knows a transmit buffer state (e.g., the amount of SDUs queued in the buffer) of the UE. However, it is difficult for the base station to perceive a state of the UE in the cases of b) and c). Therefore, a process for reporting the additional SDUs to be transmitted in the UE to the base station is required in b) and c). In this case, the UE 200 generates a status PDU that includes the amount of the additional SDUs and transmits the status PDU to the base station 100.

Reporting the additional BO for transmission of RTCP packets is required for more efficient scheduling. In general, a VoIP packet or an MPEG packet included in the PF traffic uses a real-time transport protocol (RTP) as a transport protocol. That is, a traffic packet is transmitted in an RTP/UDP/IP packet. Control information on the corresponding connection is generated during traffic transmission and is transmitted by using a real-time control transfer protocol (RTCP). An RTCP stream corresponding to such control information can be understood as a different connection and then transmitted, but it is more efficient to integrate the RTCP stream to an RTP stream that transmits a traffic packet and transmit the integrated stream. Therefore, the UE 200 generates BO for an RTCP packet corresponding to the control information that is input when transmitting a VoIP packet and transmits the BO to the base station 100. Accordingly, resource allocation and scheduling can be more efficiently performed. THE BO information for the RTCP packet may be transmitted independently of or integrally with BO information for SDUs.

Additionally, the UE 200 includes a value for requesting modification of a periodic resource allocation time in the scheduling information when it is necessary to change a resource allocation time, in step S140. The value for requesting the periodic resource allocation time can be represented by an increment or decrement in a current resource allocation time per slot unit. Herein, the value will be called a modification request value D. The resource allocation time needs to be changed when timing between a traffic source and a medium access control (MAC) is irregular, resulting in delay in a current resource allocation time.

As described above, the UE 200 generates scheduling information including at least one of BO for additional SDUs, BO for RTCP packet transmission, and a modification request value D for the resource allocation time and includes the scheduling information in a PDU, and it transmits the PDU to the base station 100, in step S150. In this case, the scheduling information can be transmitted to the base station according to one of first, second, third, and fifth resource request methods, but it is not limited thereto.

The base station performs scheduling as follows.

The base station 100 allocates a fixed size ($S\_a$) resource to the UE when time has passed since the termination of the negotiation and reaches the resource allocation start time $T\_s$. In this case, the base station may allocate resources at the resource allocation start time $T\_s$, or it allocates resources after the time interval $T\_a$ has passed from the resource allocation start time $T\_s$. In this exemplary embodiment, initial resource allocation is performed at the resource allocation start time T_s, but is not limited thereto. In addition, the amount of resources to be initially allocated to the UE 200 can be randomly determined by the base station 100.

As shown in FIG. 5, the base station 100 initially allocates a fixed-size resource at the resource allocation start time T_s by using the resource allocation timer Timer_a. When the resource allocation timer Timer_a starts counting time and the counted time passes a predetermined time interval T_a, the base station 100 allocates a predetermined-size resource to the UE 200 with reference to the amount of SDUs transmitted from the UE 200. In more detail, the resource allocation timer Timer_a is set to the negotiated time interval T_a after the initial resource allocation, and a value of the resource allocation timer T_a is decremented as time passes. The timer value is decremented per slot unit or frame unit, and it is determined that a predetermined time interval has passed when the timer value indicates "0". Herein, an event in which the value of the resource allocation timer Timer_a equals "0" is called "T_a timeout" throughout the specification for convenience of description.

As describe, when the T_a timeout is triggered, the base station 100 performs scheduling so as to allocate a fixed-size (S_a) resource to the UE 200, in steps S200 to S230. In this case, the base station 100 predetermines the size of the resource to be allocated to the UE 200 with reference to the scheduling information provided by the UE 200 upon a resource allocation request of the UE 200, and allocates the predetermined size resource to the UE 200 in steps S230 and S240.

When the scheduling is terminated, the base station resets the timer value, in step S250. Herein, resetting the timer value means that the value of the resource allocation timer T_a is restored to the negotiated time interval T_a. Therefore, when scheduling is terminated after T_a timeout has been triggered, the value of the resource allocation timer T_a is reset to T_a, and resource allocation is performed with a given time interval as described above.

However, the base station 200 may not be able to allocate resources at the time that the T_a timeout is triggered due to lack of radio resources. When the base station cannot perform scheduling, the resource allocation delay timer Timer_d is started. That is, after the resource allocation delay timer Timer_d is set to its default value of 0, the value of the Timer_d is decremented by 1 per slot so as to put resource allocation priority on the corresponding session over other sessions, in step S260. When scheduling is terminated for a session, the value of the Timer_d for the session is maintained at "0". Therefore, when scheduling for a session is not terminated, resource allocation for the session has priority over other sessions having the value of Timer_d set to "0".

However, for efficient use of resources, resource allocation can be performed when the UE has excellent channel quality even though the T_a timeout is not triggered. In this case, the value of the resource allocation timer Timer_a is not reset to T_a even though resources are allocated.

When resource allocation is performed in accordance with the above described scheduling methods and the UE 200 transmits a PDU through the allocated resource in step S270, the base station 100 analyzes information included in the received PDU in step S270. When the UE requests resource allocation according to the PV scheduling method, scheduling information is transmitted together with data, and therefore the base station 100 can analyze scheduling information from the received PDU.

When the analysis result indicates timing adjustment (TA) of a resource allocation time, the base station 100 adjusts the resource allocation time based on the TA value included in the PDU for the next resource allocation, in steps S280 to S300. Upon the TA request of the UE, a current periodic resource allocation time is shifted, and a basic unit of the TA is denoted as D, indicating the number of slots. Therefore, when the TA request value D has a positive value, a faster resource allocation timing than the current resource allocation timing is required, and when D has a negative value, a slower resource allocation timing than the current resource allocation timing is required. When receiving the TA, the base station updates a current value of the resource allocation timer Timer_a to Timer_a=Max (0, Timer_a+/−D) and applies the updated timer value to the next resource allocation. Max (0, Timer_a+/−D) indicates a larger value among "0" and "a value decremented by D from a current value of the Timer_a".

When the analysis result does not indicate resource allocation timing adjustment, that is, when the TA request value D is not included in the received PDU, the base station 100 updates scheduling information according to information included in the received PDU, in steps S310 and S320. Subsequently, the base station allocates resources based on the updated scheduling information.

In more detail, when the information included in the received PDU indicates the number of additional SDUs to be transmitted, the base station may perform additional resource allocation corresponding to the number of the additional SDUs for the corresponding session even though a time interval T_a for the corresponding session is not terminated, that is, even though time that corresponds to the time interval T_a has not passed since a previous resource allocation.

In addition, when the information included in the received PDU indicates the additional BO for RTCP packet transmission, the base station 100 may perform additional resource allocation based on the additional BO even though the time interval T_a for the corresponding session is not terminated.

The second PV scheduling method will now be described.

FIG. 6 and FIG. 7 are flowcharts of a second PV scheduling method according to a second exemplary embodiment of the present invention. Particularly, the flowchart of FIG. 6 shows an operational flowchart of the UE for the second PV scheduling, and the flowchart of FIG. 7 shows an operational flowchart of the base station for the second PV scheduling.

The second PV scheduling (PV-q) method allocates a resource of a fixed-size (S_a) to the UE with a periodic time interval T_a. Unlike the first PV scheduling method, the UE 200 is operated in one of the limited mode or normal mode and generates scheduling information according to the corresponding mode, and transmits the scheduling information to the base station.

For this purpose, as shown in FIG. 6, the UE 200 checks whether 1) resource allocation timing adjustment is requested, 2) an additional RTCP packet is input, or 3) uplink packet transmission has failed due to some reason, and selects one of the limited mode or normal mode for resource allocation, in steps S400 and S410. When one of 1), 2), and 3) cases is satisfied, the UE 200 selects the normal mode. Otherwise, the UE 200 selects the limited mode, in step S420.

When the normal mode is selected, the UE 200 adjusts the resource allocation time when the TA is necessary, as in the first exemplary embodiment of the present invention. In addition, the UE 200 checks whether an additional SDU is queued in the transmit buffer and checks whether the RTCP packet is input, and generates the corresponding BO for the additional SDU when the additional SDU is queued in the buffer and the corresponding BO for the RTCP packet when the RTCP packet is input, in steps S430 to S450.

Subsequently, the UE 200 generates scheduling information including one of the BOs for the additional SDU, the BO for the RPTC packet, and the TA request value D and includes the scheduling information in a PDU, and transmits the PDU to the base station 100, in step S460. In this case, the scheduling information can be transmitted to the base station according to one of the first, second, third, and fifth resource request methods.

When the limited mode is selected in step S430, the UE 200 checks a transmit buffer state and generates scheduling information. In more detail, the UE 200 determines the type of SDUs remaining in the transmit buffer and generates an FTI for the type of the SDUs, and uses the FTI as scheduling information, in step S470. When the UE 200 is operated in the limited mode, it is preferred that one packet is queued in the transmit buffer. Then, the UE 200 transmits a PDU including an FTI for the packet queued in the transmit buffer to the base station 100.

When the UE 200 transmits scheduling information, it transmits information on a current mode together with the scheduling information so as to make the base station 100 perceive the current mode of the UE 200. Herein, the current mode can be the limited mode or the normal mode. That is, in the normal mode, the UE 200 transmits a mode indicator indicating the normal mode together with scheduling information including BO or a TA request value D to the base station 100 according to one of the first, second, third, and fifth resource allocation methods. In addition, in the limited mode, the UE 200 includes a mode indicator indicating the limited mode and an FTI for the packets queued in the transmit buffer in a PDU and transmits the PDU to the base station 100. Then, the base station 100 determines a current mode of the UE 200 based on the mode indicator, extracts corresponding information upon a result of the determination, and performs scheduling based on the extracted information.

The base station 100 performs the second PV scheduling as follows.

According to the second exemplary embodiment of the present invention, the base station 100 performs scheduling as in the first exemplary embodiment, but it extracts the corresponding information (i.e., BO or FTI) from the received PDU according to the current mode of the UE 200 and performs scheduling based on the extracted information.

In more detail, as shown in FIG. 7, when the T_a timeout is triggered, the base station 100 performs scheduling so as to allocate a resource of a fixed size (S_a), in steps S500 to S540. In this case, upon the resource allocation of the UE 200, the base station 100 sets the size of a resource based on the scheduling information provided by the UE 200 and allocates the resource to the UE 200. Particularly, when the base station 100 allocates a resource according to the PV-q method according to the exemplary embodiment of the invention, the resource allocation is targeted for one packet. That is, the base station allocates resources enough for only one packet to be queued in the transmit packet per packet generation period. When the scheduling is terminated, the base station 100 resets a value of the resource allocation timer Timer_a. In this case, a value of the resource allocation delay timer Timer_d is maintained at "0", in step S550.

According to the above-described scheduling method, the base station 100 allocates resources, and receives a PDU from the UE 200 in step S570 and analyzes information included in the received PDU in step S580. In more detail, the base station 100 extracts a mode indicator included in the PDU and determines whether a current mode of the UE 200 is the limited mode or the normal mode.

When the UE 200 is in the normal mode, the base station 100 extracts BO or a TA request value from the information included in the received PDU. When the TA request value is included in the information, the base station adjusts the resource allocation time accordingly, in steps S590 to S610. In addition, the base station 100 updates scheduling information of the corresponding UE according to the extracted BO, in steps S620 and S630.

When the UE 200 is in the limited mode, the base station 100 extracts an FTI from the PDU and determines the type (i.e., the size) of an SDU queued in the transmit buffer of the UE 200 based on the FTI, and updates scheduling information of the corresponding UE accordingly, in step S640.

In the above-described exemplary embodiments of the present invention, the base station 100 may update scheduling information according to buffer state information provided by the UE 200.

When the buffer state information provided by the UE 200 indicates that the transmit buffer is empty, the base station 100 sets an HOL delay time included in scheduling information of the UE 200 to "NULL" and sets BO to "0". Since the transmit buffer is empty, the HOL delay time is not updated.

When the buffer state information provided by the UE 200 includes BO, the base station 100 updates the scheduling information of the UE 200 with the BO included in the buffer state information. In this case, the HOL delay time is continuously updated since SDUs are queued in the transmit buffer.

When the UE 200 transmits not the buffer state information but the PDU to the base station 100, the base station 100 subtracts the amount of data (data occupancy) that corresponds to the received PDU from BO included in the scheduling information of the UE 200. In this case, the HOL delay time is continuously updated.

When the buffer state information provided by the UE 200 includes an HOL delay time, the base station sets an HOL delay time included in the scheduling information of the UE 200 to "NULL", and the HOL delay time is not further updated.

When the buffer state information provided by the UE 200 does not include the HOL delay time, the base station 100 continuously updates an HOL delay time.

The packet scheduling and resource request methods according to the exemplary embodiments can be realized as a program and stored in a computer-readable recording medium (e.g., CD-ROM, RAM, ROM, floppy disk, hard disk, and optical disk).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

Although this invention has been described in connection with what is presently considered to be practical exemplary embodiments, it is to be understood that the invention is not limited to the disclosed embodiments. For example, a time interval negotiated between the base station and the UE may be renegotiated by the base station and the UE during the corresponding session in the respective exemplary embodiments.

According to the exemplary embodiments of the present invention, resource allocation that guarantees QoS according to characteristics of various uplink traffic can be performed in a packet-based mobile communication system.

In addition, the UE requests resource allocation in accordance with traffic characteristics and the base station performs scheduling according to the traffic characteristics so that optimal uplink scheduling can be performed.

In addition, for delay-sensitive and real-time-based PV traffic, buffer state information can be timely reported. Therefore, a necessary amount of resources can be allocated by performing a proper scheduling method.

The invention claimed is:

1. A resource allocation request method for user equipment (UE) to request resource allocation from a base station for uplink traffic transmission in a mobile communication system, the resource allocation request method comprising:
   a) checking a mode setting condition, by the UE; wherein the checking a mode setting condition comprises:
      a-1) checking whether a real-time transport control protocol (RTCP) packet is generated;
      a-2) checking whether adjustment of resource allocation time that has been negotiated with the base station is requested; and
      a-3) checking whether uplink packet transmission has failed;
   b) selecting an operation mode among a limited mode and a normal mode according to the checking result; wherein setting the operation mode comprises:
      b-1) setting the operation mode to the normal mode when the checking of any one of a-1) indicates a RTCP packet is generated, the checking of a-2) indicates adjustment of the resource allocation time is requested, and the checking of a-3) indicates uplink packet transmission failed;
      b-2) otherwise, setting the operation mode to the limited mode.
   c) when the normal mode is selected, generating scheduling information that indicates a state of a transmit buffer in which a packet to be transmitted by the UE is queued, by the UE;
   d) when the limited mode is selected, generating scheduling information that indicates a packet queued in the transmit buffer, by the UE; and
   e) requesting resource allocation from a base station while transmitting the scheduling information to the base station, by the UE.

2. The resource allocation request method of claim 1, wherein, a-3) comprises, when the UE is not allocated with a resource from the base station or when the base station allocates a resource and the UE is not able to decode resource allocation information, performing no uplink packet transmission.

3. The resource allocation request method of claim 1, wherein d) comprises, when the operation mode is set to the normal mode, generating scheduling information including at least one of the amount of packet data queued in the transmit buffer, the amount of packet data that can be added, and a resource allocation time adjustment request value.

4. The resource allocation request method of claim 1, wherein d) comprises, when the operation mode is set to the limited mode, generating scheduling information including a frame type indicator (FTI) for indicating a packet queued in the transmit buffer.

5. The resource allocation request method of claim 1, wherein e) comprises transmitting a mode identifier for identifying the set mode to the base station, together with the scheduling information.

6. The resource allocation request method of claim 1, wherein e) comprises transmitting the packet queued in the transmit buffer to the base station, together with the scheduling information.

7. The resource allocation request method of claim 1, wherein the uplink traffic generates a packet with a size that varies among a plurality of predetermined fixed sizes with a periodic time interval.

8. A resource allocation request method for user equipment (UE) to request resource allocation from a base station for uplink traffic transmission in a mobile communication system, the resource allocation request method comprising:
   a) generating, in the user equipment, first buffer state information that indicates a state of a transmit buffer in which a packet to be transmitted is queued, by the UE;
   b) generating, in the user equipment, second buffer state information that indicates a state of a transmit buffer in which a real-time transport control protocol (RTCP) packet to be transmitted is queued, by the UE;
   c) when adjustment of a resource allocation time that has been negotiated with the base station is required, generating a resource allocation time adjustment request value;
   d) generating, in the user equipment, scheduling information selectively including one of the first and second buffer state information and the resource allocation time adjustment request value; and
   e) requesting resource allocation from the base station while transmitting the scheduling information to the base station, together with the packet queued in the transmit buffer, wherein transmitting, from the UE, the scheduling information to the base station comprises: transmitting scheduling information according to one of first to fifth resource request methods including:
      e-1) the first resource request method for including the scheduling information in a status packet data unit (PDU) and transmitting the PDU to the base station;
      e-2) the second resource request method for including the scheduling information in a PDU header and transmitting the PDU to the base station;
      e-3) the third resource request method for consecutively appending the scheduling information to a PDU and transmitting the scheduling information and the PDU to the base station;
      e-4) the fourth resource request method for transmitting the scheduling information to the base station by random access; and
      e-5) the fifth resource request method for transmitting the scheduling information to the base station through a physical channel.

9. The resource allocation request method of claim 8, wherein the uplink traffic is periodic-interval variable-size (PV) traffic.

10. A packet scheduling method for uplink traffic transmission from user equipment (UE) to a base station in a mobile communication system, the packet scheduling method comprising:
   a) receiving a packet frame together with scheduling information from the UE, by the base station, the size of the packet frame varying with a periodic time interval;
   b) analyzing, in the base station, the scheduling information to determine whether the scheduling information includes a state of a transmit buffer of the UE in which a real-time transport control protocol (RTCP) packet is queued;
   c) if the scheduling information is determined to include the state of a transmit buffer in which RCTP packets are queued, updating scheduling information for a session with the UE according to the scheduling information and the state of the transmit buffer and allocating a variable size resource for the session with the UE based on the updated scheduling information, wherein c) comprises:

c-1) determining a mode selected by the UE based on the scheduling information;

c-2) when a normal mode is selected, acquiring resource allocation time adjustment information or information on a packet queued in a transmit buffer of the UE from the scheduling information transmitted from the UE;

c-3) when a limited mode is selected, acquiring information on the packet queued in the transmit buffer from the scheduling information transmitted from the UE; and c-4) updating scheduling information for the session with the UE according to the acquired information; and d) if the scheduling information is determined not to include the state of a transmit buffer in which RCTP packets are queued, waiting until a predetermined time interval has passed before periodically updating scheduling information for a session with the UE according to the scheduling information and allocating a variable size resource for the session with the UE based on the updated scheduling information.

11. The packet scheduling method of claim 10, wherein d) comprises performing resource allocation per packet unit when the limited mode is selected.

12. The packet scheduling method of claim 10, the packet scheduling method comprising performing the scheduling for traffic that generates a packet having a size that periodically varies within a plurality of predetermined fixed sizes.

13. The packet scheduling method of claim 10, further comprising adjusting a resource allocation time negotiated with the UE, based on the updated scheduling information when the scheduling information includes the resource allocation time adjustment information, and wherein d) comprises performing resource allocation for the session with the UE based on the updated scheduling information at the adjusted resource allocation time.

* * * * *